United States Patent [19]

Bentsen

[11] 4,428,529

[45] Jan. 31, 1984

[54] FLOW SYNCHRONIZATION

[75] Inventor: Louis J. Bentsen, Arlington Heights, Ill.

[73] Assignee: Honeywell Inc., Minneapolis, Minn.

[21] Appl. No.: 401,507

[22] Filed: Jul. 26, 1982

[51] Int. Cl.³ ............................................. F24F 13/10
[52] U.S. Cl. ........................................ 236/49; 98/32; 137/486
[58] Field of Search ............... 137/486, 487.5; 236/49; 98/1.5, 32; 165/15

[56] References Cited

U.S. PATENT DOCUMENTS

| | | | |
|---|---|---|---|
| 3,611,906 | 10/1971 | Lorenz | 236/49 X |
| 3,951,336 | 4/1976 | Miller et al. | 98/1.5 |
| 4,077,567 | 3/1978 | Ginn et al. | 236/49 |
| 4,147,298 | 4/1979 | Leemhuis | 236/49 |
| 4,263,931 | 4/1981 | Bramow et al. | 236/49 X |
| 4,272,966 | 6/1981 | Niemann et al. | 236/49 X |
| 4,284,237 | 8/1981 | Harris et al. | |
| 4,375,224 | 3/1983 | Noll | 137/486 |

OTHER PUBLICATIONS

Honeywell Form No. 77-9347 Rev. 3-80.
Honeywell Form No. 77-9826 Rev. 5-75.
Honeywell Form No. 77-9283 Rev. 9-78.
Honeywell Form No. 77-9852 Rev. 6-79.
Honeywell Form No. 77-9847 Rev. 9-75.

Primary Examiner—William E. Tapolcai
Attorney, Agent, or Firm—John P. Sumner

[57] ABSTRACT

Disclosed is a system for controlling the static pressure within a controlled space, the controlled space having a supply duct for providing air to the space and a return duct for exhausting air from the space. The system comprises apparatus for adjusting the amount of air being supplied to the controlled space. The system further comprises a minimum/maximum control having a single adjustment for controlling either the minimum flow rate or the maximum flow rate in both ducts simultaneously (a minimum/maximum control having a single adjustment for controlling the minimum flow rate in both ducts simultaneously and a single adjustment for controlling the maximum flow rate in both ducts simultaneously is also consistent with the present invention).

16 Claims, 2 Drawing Figures

FLOW SYNCHRONIZATION

BACKGROUND OF THE INVENTION

The present invention relates to a system for controlling the static pressure within a controlled space such as a laboratory, the controlled space having a supply duct for providing air to the space and a return duct for exhausting air from the controlled space. More particularly, the present invention relates to regulating the minimum and/or maximum flow rate in both ducts without the need to adjust the minimum or maximum flow rate for each duct separately.

SUMMARY OF THE INVENTION

As previously mentioned, the present invention is a system for controlling the static pressure within a controlled space, the controlled space having a supply duct for providing air to the space and a return duct for exhausting air from the space. The system comprises apparatus for adjusting the amount of air being supplied to the controlled space. The system further comprises a minimum/maximum control having a single adjustment for controlling either the minimum flow rate or the maximum flow rate in both ducts simultaneously (a minimum/maximum control having a single adjustment for controlling the minimum flow rate in both ducts simultaneously and a single adjustment for controlling the maximum flow rate in both ducts simultaneously is also consistent with the present invention).

DETAILED DESCRIPTION OF THE PREFERRED EMBODIMENT

Figure 1:
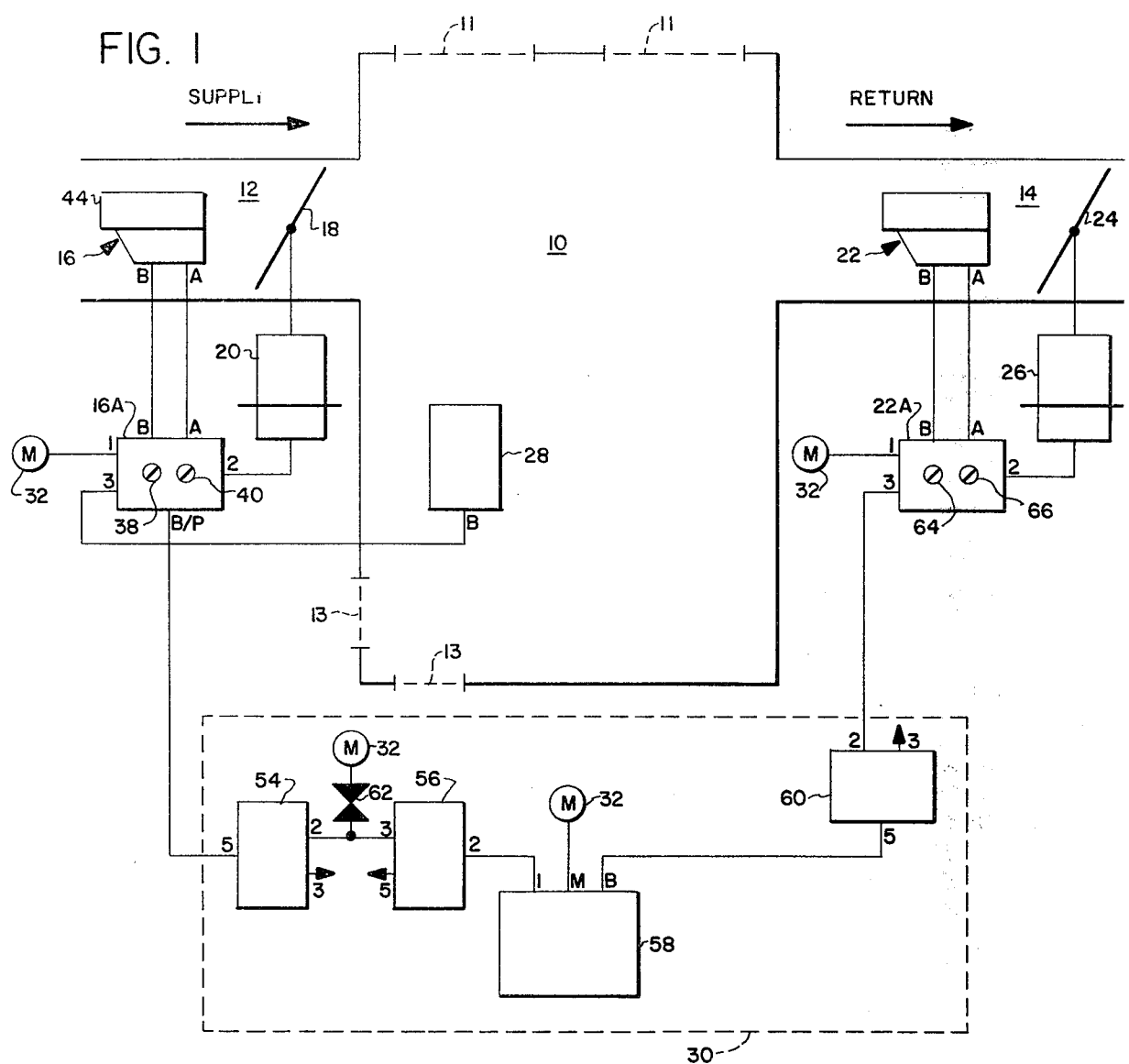
FIG. 1 illustrates a preferred embodiment of a system comprising the present invention.

A controlled space 10 such as a laboratory is schematically illustrated in FIG. 1. Space 10 is shown comprising a supply duct 12 for providing air to the space and a return duct 14 for exhausting air from the space. Controlled space 10 may or may not have other means of inletting or exhausting air. For example, a laboratory schematically represented by controlled space 10 may or may not have exhaust hoods 11 located within the laboratory separate from return duct 14 for exhausting fumes from the laboratory. In addition, controlled space 10 may include leaks 13 such as around doors or windows.

It is common to regulate the pressure within a controlled space relative to the pressure outside of the controlled space. For example, it may be desired to maintain the static pressure within controlled space 10 at a static pressure less than the static pressure outside of the controlled space. After this is accomplished, fumes or air within the controlled space will not be likely to leak out of the controlled space except through the return duct or other exhaust ports intended or used for that purpose. On the other hand, it may be desired to maintain the static pressure within controlled space 10 at a pressure greater than the static pressure outside of the controlled space so that fumes or air outside of the controlled space will not tend to infiltrate into the controlled space. Alternately, it may be desired to maintain approximately the same pressure both within and outside of the controlled space.

Typically, in order to obtain a static pressure within controlled space 10 that is less than the static pressure outside of the controlled space, the flow rate into space 10 (including the flow through supply duct 12) is caused to be less than the flow rate from space 10 (including the flow through return duct 14). Conversely, if it is desired that the static pressure within controlled space 10 be greater than the static pressure outside of the controlled space, the flow rate into space 10 (including the flow through supply duct 12) is typically made to be greater than the flow rate from space 10 (including the flow through return 14). Alternately, if it is desired to maintain the same static pressure within controlled space 10 as outside of controlled space 10, the flow rates into and out of space 10 (including the flow through the supply and return ducts 12 and 14) are made to be substantially equal.

In ventilating a controlled space 10, it is also frequently of interest to maintain a minimum flow rate in both the supply and return ducts and a maximum flow rate in both the supply and return ducts. A minimum flow rate is desired since, even though the thermostat or other flow adjust device within the system may not be calling for air, a minimum amount of air flow is desired to maintain proper ventilation. A maximum flow rate is desired so that, even though the thermostat or other flow adjust device might be calling for more air, the maximum flow rate prevents too much air from being used by the controlled space, thus preventing drafts and excessive noise.

In adjusting the minimum and maximum flow rates within typical prior art systems, it has normally been necessary to separately adjust both the minimum and maximum flow rates at two separate locations, typically at the supply and return duct locations. Such separate adjustments are inconvenient and lead to likelihood of human error, such as forgetting to adjust both locations. Through the present invention, this inconvenience and potential error is eliminated by having a single point at which to adjust the minimum and/or maximum flow rates in both ducts simultaneously.

FIG. 1 illustrates the preferred embodiment of a system comprising the present invention. The system comprises a first sensor 16 mounted in supply duct 12 for sensing the amount of air moving through supply duct 12. Sensor 16 is typically a velocity sensor for sensing the velocity of air moving through duct 12, although sensor 16 may be a velocity pressure sensor.

The present system further comprises a first air flow control connected to first sensor 16 for controlling the amount of air moving through supply duct 12. In the embodiment illustrated, the first air flow control comprises a damper 18, a damper motor or operator 20, and a controller 16A.

The present system also comprises a second sensor 22 mounted in return duct 14 for sensing the amount of air moving through return duct 14. As with first sensor 16, second sensor 22 is typically a velocity sensor, although it may comprise a velocity pressure sensor.

The present invention further comprises a second air flow control connected to second sensor 22 for controlling the amount of air moving through the return duct 14. In the embodiment shown, the second air flow control comprises a damper 24, a damper motor or operator 26, and a controller 22A, damper 24 being connected to operator 26 which in turn is connected to controller 22A.

Second sensor 22 and its associated controller 22A may be identical to sensor 16 and its controller 16A, both of which are described below.

A suitable velocity sensor 16 and its associated controller 16A is a Velocitrol CP980C or D, type B, manufactured by Honeywell Inc. and described in Honeywell Inc. Commmercial Division Form Number 77-9347, Rev. 3-80. The Honeywell CP980C or D, type B sensor/controller may be used to detect and control air flow in a duct while providing high and low air volume limits and is typically used in conjunction with a one-pipe bleed thermostat such as thermostat 28 located within the controlled space. Thermostat 28 may comprises a Honeywell TP973 thermostat described in Honeywell Inc. Commercial Division Form Number 77-9826, Rev. 5-75. (Although control 28 typically comprises a thermostat for controlling the flow rate or amount of air being supplied to controlled space 10, control 28 could alternately comprise a manual method of adjusting flow rate in the system. For example, control 28 could comprise a manual switch such as a Honeywell Inc. CP970.)

Figure 2:
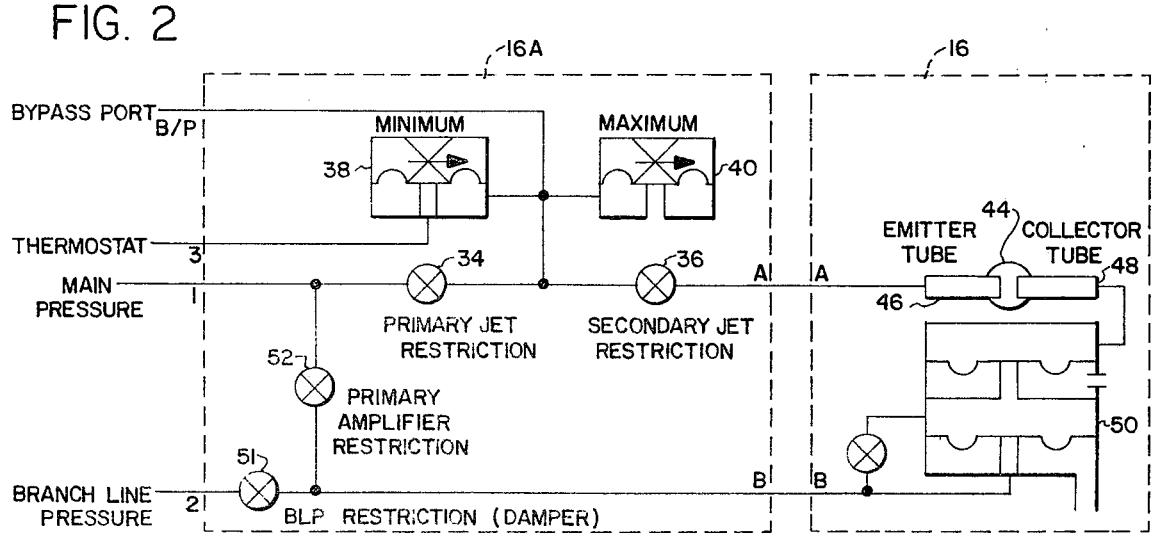
FIG. 2 is a more detailed illustration of a component within the present system.

Sensor 16 and controller 16A are shown in more detail in FIG. 2. Sensor 16 is described in U.S. Pat. No. 4,182,486 which is incorporated by reference herein. Sensor 16 operates by having air flow into orifice or tube 44. Within tube 44, air provided by controller 16A is emitted by emitter tube 46 and collected by collector tube 48, tubes 46 and 48 being perpendicular to tube 44. As flow rate through tube 44 increases, less air emitted by tube 46 is collected by tube 48. Sensor 16 can be configured so that an output pressure at port B of the sensor is either directly or inversely related to flow rate through tube 44. In the embodiment shown in FIG. 2, amplifier 50 provides an output pressure at port B of sensor 16 that is inversely related to the flow rate through tube 44.

In the operation of controller 16A, air from a main pressure supply 32 enters the controller at port 1, passes through a primary jet restriction 34 to a secondary jet restriction 36, to a minimum flow limit adjust 38, to a maximum flow adjust 40, and to a bypass port B/P. Air entering controller 16A at port 1 also passes through primary amplifier restriction 52 and into port B of sensor 16.

Minimum flow limit adjust 38 is connected to port 3 of controller 16A and provides the supply of air for control 28, here discussed as the bleed type thermostat previously described. Accordingly, port 3 of controller 16A is connected to port B of thermostat 28. The thermostat pressure determines the pressure to secondary restriction 36 within the flow limit settings of minimum and maximum flow limit adjusts 38 and 40. This determines the flow through emitter tube 46 within sensor 16.

The minimum flow limit established by minimum flow limit adjust 38 prevents thermostat 28 from bleeding the pressure to secondary restriction 36 below the minimum setting. The maximum flow limit determined by maximum flow limit adjust 40 prevents thermostat 28 from building pressure to secondary restriction 36 above the maximum setting.

Once control or thermostat 28 establishes a velocity control point, any increase in velocity of flow through duct 12 results in a decrease in branch line pressure at port B of sensor 16 and, after passing through branch line pressure restriction 51, at port 2 of controller 16A.

Branch line pressure from port 2 of controller 16A is connected to damper motor 20 which in turn is connected to damper 18. Once control or thermostat 28 establishes a velocity control point, any increase in velocity within duct 12 will result in a decrease in branch line pressure to damper motor or operator 20, since sensor 16 is reverse acting. This closes damper 18, reducing velocity to the control point. A change in temperature in controlled space 10 modulates the pressure at thermostat 28. This provides a new pressure to secondary jet restriction 36 within the minimum and maximum limits determined by adjusts 38 and 40 which resets the velocity control point to control the temperature at an equilibrium condition. The pressure at bypass port B/P is the control pressure of controller 16A and is passed through control 30 to port 3 of controller 22A.

Control 30 connected between the bypass port B/P of controller 16A and port 3 of controller 22A may be adjusted to cause the flow rate in return duct 14 to be different from the flow rate in supply duct 12. This difference can be regulated in terms of a percentage or in terms of a fixed offset, e.g., the return air flow rate being 80% of the supply air flow rate or the supply air flow rate being 200 cubic feet per minute less than the return air flow rate.

Control 30 comprises a lockout relay or repeater 54, an averaging relay 56, a control 58, and a second lock out relay or repeater 60.

Relays 54 and 60 may comprise Honeywell Inc. RP470B pneumatic selector relays described in Honeywell Inc. Commercial Division Form Number 77-9852, Rev. 6-79. Averaging relay 56 may comprise a Honeywell Inc. RP973A pneumatic averaging relay described in Honeywell Inc. Commercial Division Form Number 77-9847, Rev. 9-75. Control 58 may comprise a Honeywell Inc. RP908A pneumatic controller described in Honeywell Inc. Commercial Division Form Number 77-9283, Rev. 9-78.

A port 5 of relay 54 is connected to bypass port B/P of controller 16A. A port 3 of relay 54 is vented. A port 2 of relay 54 is connected through a restrictor 62 to main pressure 32 and to a port 3 of relay 56. A port 5 of relay 56 is vented, while a port 2 of relay 56 is connected to a port 1 of controller 58. Port M of control 58 is connected to main pressure 32, and a port B of control 58 is connected to a port 5 of relay 60. A port 3 of relay 60 is vented, and a port 2 of relay 60 is connected to a port 3 of controller 22A.

Relay 54 serves as a repeater relay thus repeating at port 2 the signal received at port 5 while isolating line 2 from line 5. The pressure signal thus provided at port 2 of relay 54 is received at port 3 of averaging relay 56. Averaging relay 56 provides a pressure at port 2 which is equal to one-half of that received at port 3. This pressure provided by port 2 of averaging relay 56 is received by port 1 of control 58 which can be adjusted to provide a pressure at its port B which is a percentage of the pressure received at its port 1; alternately, control 58 can be adjusted to provide a fixed difference in flow rates between the supply and return ducts 12 and 14. These adjustments are accomplished by two adjustments within the control, one to adjust percentage gain, the other, called setpoint, to adjust the fixed difference.

The pressure provided by port B of control 58 is received by port 5 of repeater relay 60 which repeats at its port 2 the pressure received at its port 5 while isolating port 2 from port 5. The pressure provided at port 2 of repeater relay 60 is received at port 3 of controller 22A which pressure serves to regulate the flow rate is return duct 14. (The operation of controller 22A is identical to that of controller 16A.)

Within controller 22A, minimum flow rate adjust 64 is typically adjusted to its zero position. Maximum flow rate adjust 66 within controller 22A is typically set at its most maximum position. In this manner, the minimum and maximum flow rate adjusts 64 and 66 within controller 22A are of no effect. Accordingly, the minimum and maximum flow rates within supply duct 12 are governed by controller 16A while the minimum and maximum flow rates within return duct 14 are governed by the same settings within controller 16A as well as the settings within control 30 as established primarily by control 58.

The present invention is to be limited only in accordance with the scope of the appended claims since others skilled in the art may devise other embodiments still within the limits of the claims. For example, the control which is adjusted to control the minimum and/or maximum flow rates in both ducts simultaneously (controller 16A in the present disclosure) could be associated with either the supply duct or the return duct; although in the embodiment disclosed controller 16A is associated with supply duct 12, controller 22A associated with return duct 14 could also have been selected for this purpose.

The embodiments of the invention in which an exclusive property or right is claimed are defined as follows:

1. A system for controlling the static pressure within a controlled space, the controlled space having supply duct means for providing air to the space and return duct means for exhausting air from the controlled space, the system comprising:
   first air flow sensor means mounted in the supply duct means for sensing the amount of air moving through the supply duct means;
   first air flow control means connected to the first air flow sensor means for controlling the amount of air moving through the supply duct means;
   second air flow sensor means mounted in the return duct means for sensing the amount of air moving through the return duct means;
   second air flow control means connected to the second air flow sensor means for controlling the amount of air moving through the return duct means;
   one of the first or second air flow control means comprising minimum/maximum control means having a single adjustment for controlling either the minimum flow rate or the maximum flow rate in both duct means simultaneously; and
   adjust means connected to the minimum/maximum control means for adjusting the amount of air being supplied to the controlled space.

2. The apparatus of claim 1 wherein the minimum/maximum control means has a single adjustment for controlling the minimum flow rate in both duct means simultaneously, the minimum/maximum control means further having a single adjustment for controlling the maximum flow rate in both duct means simultaneously.

3. The apparatus of claim 1 or 2 wherein the minimum/maximum control means comprises additional control means for adjusting the flow rate in one of the duct means to be different from the flow rate in the other of the duct means.

4. The apparatus of claim 3 wherein the additional control means comprises means for adjusting the flow rate in one of the duct means to be a percentage of the flow rate in the other of the duct means.

5. The apparatus of claim 3 wherein the additional control means comprises means for adjusting the flow rate in one of the duct means to be a fixed offset of the flow rate in the other of the duct means.

6. The apparatus of claim 1 or 2 wherein the first and second air flow sensor means each comprise a velocity sensor for sensing the velocity of air moving through the duct means.

7. The apparatus of claim 1 or 2 wherein the adjust means comprises a thermostat for adjusting the amount of air being supplied to the controlled space.

8. A system for controlling the static pressure within a controlled space, the controlled space having a supply duct for providing air to the space and a return duct for exhausting air from the space, the system comprising:
   first means mounted in the supply duct for controlling the amount of air moving through the supply duct;
   second means mounted in the return duct for controlling the amount of air moving through the return duct; and
   minimum/maximum control means having a single adjustment connected to the first and second means for controlling either the minimum flow rate or the maximum flow rate in both ducts simultaneously.

9. The apparatus of claim 8 wherein the minimum/maximum control means has a single adjustment for controlling the minimum flow rate in both ducts simultaneously, the minimum/maximum control means further having a single adjustment for controlling the maximum flow rate in both ducts simultaneously.

10. The apparatus of claim 8 or 9 wherein the minimum/maximum control means comprises additional control means for controlling the flow rate in one of the ducts to be different from the flow rate in the other of the ducts.

11. The apparatus of claim 10 wherein the additional control means comprises means for controlling the flow rate in one of the ducts to be a percentage of the flow rate in the other of the ducts.

12. The apparatus of claim 10 wherein the additional control means comprises means for controlling the flow rate in one of the ducts to be a fixed offset of the flow rate in the other of the ducts.

13. The apparatus of claim 8 or 9 wherein one of the means for controlling comprises a thermostat for controlling the amount of air being supplied to the controlled space.

14. The apparatus of claim 8 or 9 wherein at least one of the means for controlling comprises a flow sensor mounted in one of the ducts.

15. The apparatus of claim 14 wherein the flow sensor comprises a velocity sensor.

16. The apparatus of claim 8 or 9 wherein each of the first and second means for controlling comprises a damper.

* * * * *